(12) United States Patent
Chaudhuri

(10) Patent No.: US 10,737,540 B2
(45) Date of Patent: Aug. 11, 2020

(54) AUTOMATIC TIRE PRESSURE REGULATION SYSTEM

(71) Applicant: Sid Chaudhuri, East Brunswick, NJ (US)

(72) Inventor: Sid Chaudhuri, East Brunswick, NJ (US)

(73) Assignee: Sid Chaudhuri, East Brunswick, NJ (US)

( * ) Notice: Subject to any disclaimer, the term of this patent is extended or adjusted under 35 U.S.C. 154(b) by 233 days.

(21) Appl. No.: 15/921,291

(22) Filed: Mar. 14, 2018

(65) Prior Publication Data

US 2019/0283510 A1    Sep. 19, 2019

(51) Int. Cl.
*B60C 23/00* (2006.01)

(52) U.S. Cl.
CPC .................................. *B60C 23/004* (2013.01)

(58) Field of Classification Search
CPC ............................. B60C 23/004; B60C 23/12
USPC .......................... 152/419, 423, 424, 425, 426
See application file for complete search history.

(56) References Cited

U.S. PATENT DOCUMENTS

| | | | | |
|---|---|---|---|---|
| 677,710 A * | 7/1901 | Stacy | ...................... | B60C 23/12 152/425 |
| 906,933 A * | 12/1908 | Rice | ........................ | B60C 27/00 152/181 |
| 1,067,439 A * | 7/1913 | Olmstead | ................. | B60C 23/12 152/421 |
| 4,840,212 A * | 6/1989 | Wei | .......................... | B60C 23/12 116/34 R |
| 5,616,196 A * | 4/1997 | Loewe | ................... | B60C 23/004 152/426 |
| 5,865,917 A * | 2/1999 | Loewe | ................... | B60C 23/004 152/426 |
| 2008/0289739 A1* | 11/2008 | Bol | ........................ | B60C 23/004 152/425 |
| 2010/0139828 A1* | 6/2010 | Lee | ......................... | B60C 23/12 152/426 |

* cited by examiner

*Primary Examiner* — Kip T Kotter

(57) ABSTRACT

The present invention provides a tire pressure regulation system for use in a pneumatic tire mounted on a vehicle to continuously maintain a predetermined optimum pressure by automatically inflating or deflating the tire as needed. The system employs one or more actuators, an air pump pneumatically coupled to the tire and a motion reversal device coupling the actuator and the piston of the pump. The actuators are controlled by the tire pressure in one direction and the tension of one or more springs in the other direction. The springs are attached to the handle of the piston at one end and the body of the pump at the other end to provide the appropriate tension to maintain the optimum pressure in the tire. When the tire pressure is low the pump piston is pulled out. The piston pumps air into the tire when the pulled out pump piston is pressed against the road while the vehicle is in motion. A separate rod coupling the piston handle and a valve in the tire is also provided to deflate the tire when the tire pressure is higher than a predetermined high pressure value.

20 Claims, 11 Drawing Sheets

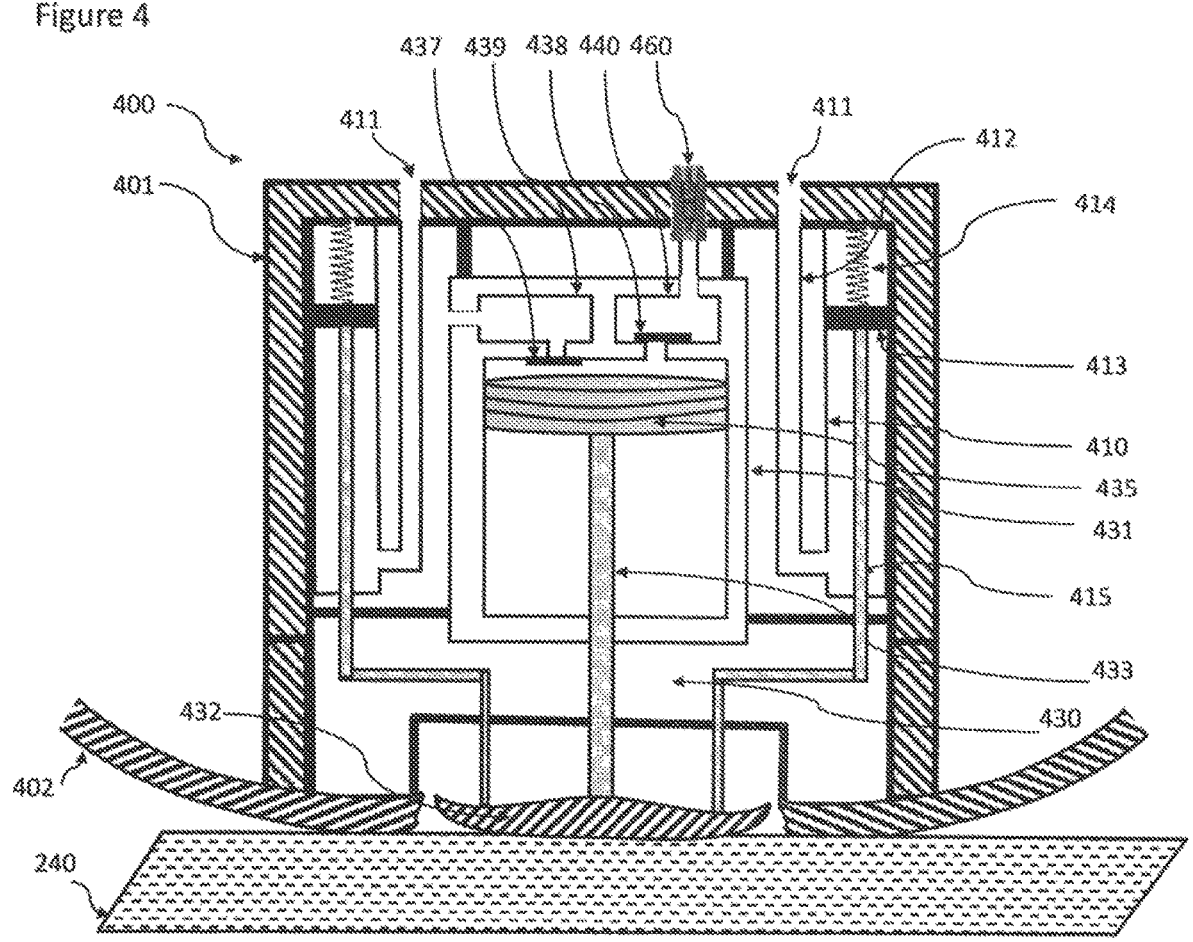

AUTOMATIC TIRE PRESSURE REGULATION SYSTEM

FIELD OF THE INVENTION

This invention generally relates to automatic tire inflation and deflation to continuously maintain a vehicle tire pressure to its recommended value, and specifically improvements in which no external compressed air source is required.

BACKGROUND OF THE INVENTION

This invention relates generally to a pneumatic tire pressure regulation system to inflate and deflate the tire as needed in order to maintain the air pressure in the tire at an optimum value and more specifically to an automatic tire pressure regulation system which requires no compressor or outside source of pressurized air.

Maintaining optimum tire pressure in a vehicle is important for safety and fuel efficiency. The Transportation Recall Enhancement, Accountability and Documentation (TREAD) Act is a United States federal law enacted in 2000. One of the mandates of the TREAD Act is to implement a suitable Tire Pressure Monitoring System (TPMS) technology in all light weight motor vehicles to alert drivers of under-inflated tires. Currently all tires implement TPMS. TPMS alerts a driver only when the pressure is below a certain minimum threshold value that renders the tire to be unsafe. While the TPMS can send the actual tire pressure value to the vehicle computer for display to the driver, it is not practical that the driver would inflate the tire whenever the pressure is below the optimum value but still above the safety threshold value. Both safety and fuel efficiency are compromised when the pressure is below the optimum value even if not as low as the threshold value.

Tire pressure changes significantly with the outside ambient temperature. As a result, it is desirable to adjust tire pressure seasonally for fuel efficiency and to some extent better safety even if the pressure is above the TPMS threshold value but below the optimum value. Frequent tire inflation checking and pressure adjustment is a chore that drivers would not perform. It would be desirable if the task of checking as well as properly inflating tires is completely eliminated. Thus there is a need for an automatic tire pressure system that inflates and deflates the tire as needed to maintain the recommended optimum tire pressure all the time without the driver's intervention.

Attempts have been made previously to provide automatic tire pressure inflating systems. Examples of such attempts are found in the U.S. Pat. Nos. 939,020; 1,029,340; 1,327,371; 1,456,567; 2,021,646; 2,420,224; 4,269,252; 4,651,792; and U.S. Pat. Nos. 6,401,743; and 8,113,234. Most of these systems require a pump housed inside the tire or the tube of the tire and is operated by the compression or flexing of the tire. One drawback of these systems is that frequent direct impact of the pump levers on the tire itself tends to damage the tire and the pumping mechanism. Second drawback is that the manufacturing and installation of such systems inside the tire is complex and expensive. Other systems require an external source of compressed air. This type of devices has already been available and used mostly in heavy trucks and recreational vehicles. The main drawback of such devices for application in light weight vehicles is the complexity and high cost.

Thus there is a need for an automatic tire pressure system that does not require an external source of compressed air and that is simple, inexpensive, easier to manufacture, and durable.

SUMMARY OF THE INVENTION

A tire pressure regulation system is provided for use with pneumatic tires. The regulation system comprises a housing, one or more actuators, a reverse actuation element, and an air pump pneumatically coupled to the tire. One or more rods couple the reverse actuation element and the air pump at the handle of the pump. The actuators, the pump, and the rod(s) are incorporated in the housing. The housing can be conveniently mounted inside a cavity specially made inside the road contact surface also known as the crown of the tire. The actuators are controlled by the tire pressure in one direction and the tension of one or more springs in the other direction. The springs are attached to the handle of the piston at one end and the body of piston at the other end to provide the appropriate tension to maintain the optimum pressure in the tire. When the tire pressure is lower than a predetermined value which is typically the recommended pressure of the tire, the pump piston is pulled out by a rod of the pump connecting the pump handle and the piston, resulting in the pump taking in a quantity of atmospheric air. The piston discharges at least a portion of the quantity of atmospheric air into the tire when the pulled out pump handle is pressed against the road while in motion.

A separate pressure deflation system for deflating a tire when it is overinflated to a pressure above the recommended value is also provided. The deflation system can be an integral part of the aforementioned tire pressure regulation system or it can be a standalone system. In the integrated system, an additional conventional valve and a rod coupling the piston handle of the pump and the conventional valve are provided. When the tire pressure is higher than the predetermined optimum value the actuator rod moves radially outwards. The rod in turn pushes the pump handle inwards. The rod attached to the pump handle then pushes the valve to deflate the tire as it is done manually through a conventional valve.

Additional features of the pressure regulation system are also provided. The size of the housing can be designed for optimal operation of the pressure regulation system. It is small enough not to compromise the integrity of the tire and yet large enough so that the number of piston strokes is not too high. The handle of the pump piston can be designed so that the impact of the piston rod when it is extended and hits the road is minimized. The system can include a device to communicate to the vehicle computer whenever the pump is activated so that the driver can be alerted if there is a leak in the tire.

BRIEF DESCRIPTION OF THE DRAWINGS

FIG. 1B depicts a schematic diagram of the conventional air pump showing the air flow while the piston is being pushed in.

FIG. 4 depicts a schematic diagram in a vertical cross-sectional view of the salient components of the tire pressure regulation system according to a second embodiment of the invention.

DETAILED DESCRIPTION

Figure 1A:
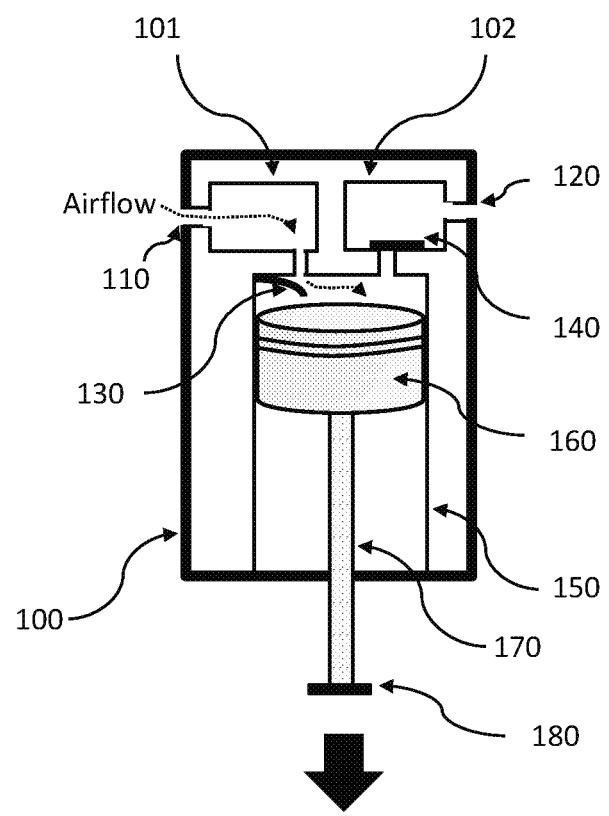
FIG. 1A depicts a schematic diagram of the salient components of a conventional air pump in a vertical cross-sectional view showing the air flow while the piston is being pulled out.
Figure 1B:
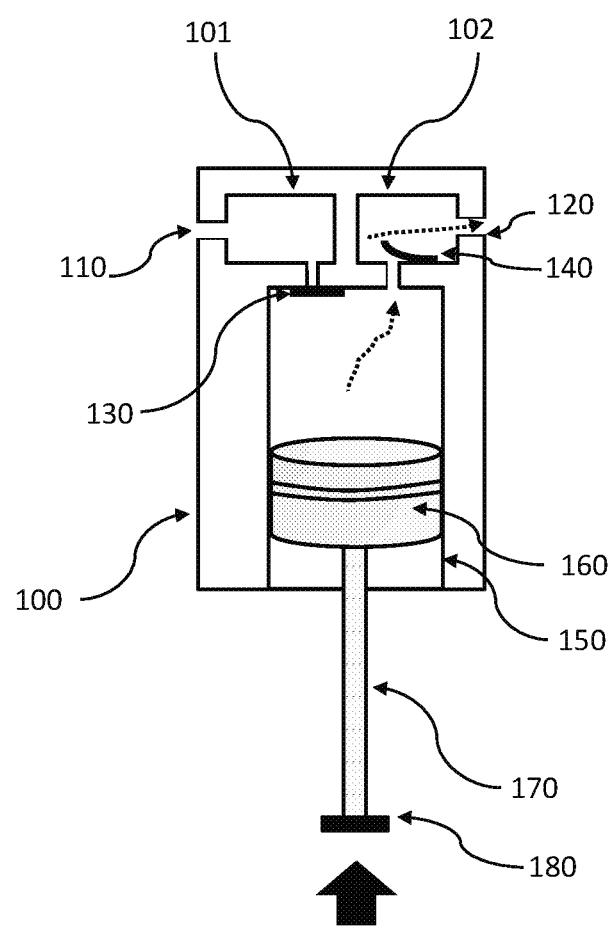

FIG. 1A depicts the salient components of a conventional air pump showing the operations of air intake from the atmosphere. The pump housing 100 is typically a metal cylinder. In the housing there is an inlet valve head 101 for letting atmospheric air through the inlet 110 and an outlet valve head 102 for discharging compressed air through the outlet 120 to a tire. The outlet 120 is pneumatically coupled to the valve of a valve stem of the tire by a tube. An inlet valve 130 is attached underneath the inlet valve head 101. An outlet valve 140 is attached inside the outlet valve head 102. The valves 130 and 140 are typically metal flaps for opening and closing air flow between the pump chamber 150 and the valve heads. When the piston 160 is pulled out by pulling the piston handle 180 that is attached to the piston 160 by a piston rod 170 vacuum is created in the area of the pump chamber 150 above the piston 160. The valve 130 is opened by the differential pressure between the atmosphere and the vacuum below the valve 130 inside the pump chamber 150. Because of the higher pressure inside the tire the outlet valve 140 stays closed during this operation. The pump chamber is 150 mostly filled with air at atmospheric pressure when the piston 160 is pulled out completely. In the next step, as shown in FIG. 1B, when the piston 160 is pushed into the pump body 150 the atmospheric air taken into air taken into the chamber 150 is compressed. During the compression the inlet valve 130 is closed by the differential air pressure. When the piston is pushed in sufficiently the air inside the chamber 150 is compressed to such an extent that the air pressure inside the chamber 150 exceeds the air pressure inside the tire. The differential air pressure then opens the outlet valve 140 and at least a portion of the compressed air inside the chamber 150 is pushed into the tire. The piston in and out strokes are then repeated until the tire pressure reaches a desired value typically measured by a gauge attached to the pump or an external gauge.

Figure 2:
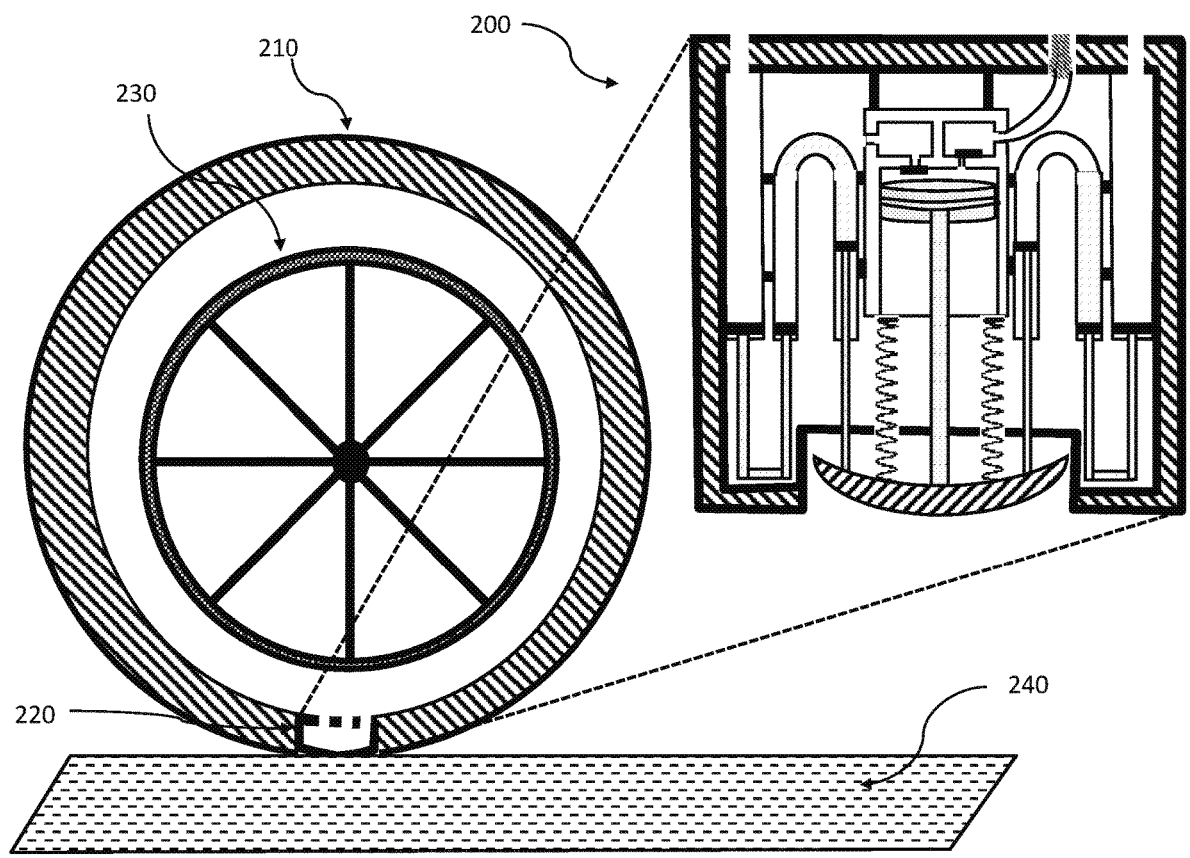
FIG. 2 depicts a schematic diagram in a vertical cross-sectional view of a tire pressure regulation system mounted in an inset of the crown of a tire in accordance with the current invention.

FIG. 2 depicts a schematic diagram in a vertical cross-sectional view of a pressure regulation system generally designated as 200 in accordance with the current invention. The pressure regulation system 200 is mounted in a cavity 220 made inside the crown of the tire 210. The cavity 220 can be made by widening a groove or removing a tread in a small portion of the crown of the tire. A sufficiently deep cavity to hold the regulation system 200 completely inside the crown and to be flush with the outer surface of the tire is created so that the contact of the tire 210 with a road surface 240 is smooth. This may require appropriate structural modification of the tire to hold the regulation system 200. The tire belts in the cavity section may need to be intruded towards the rim 230 beneath the crown of tire 210. The structural integrity of the tire with the cavity intruding into the tire 210 can be provided by appropriate design of the various components of the tire 210, namely, the inner liner, tire bead, body piles, tire belts, and the tread. The structural components of the tire are not shown in the diagram. The shape of the cavity 220 is in conformance with that of the regulation system 200 which can be designed to fit in well with the overall shape of the tire.

Figure 3A:
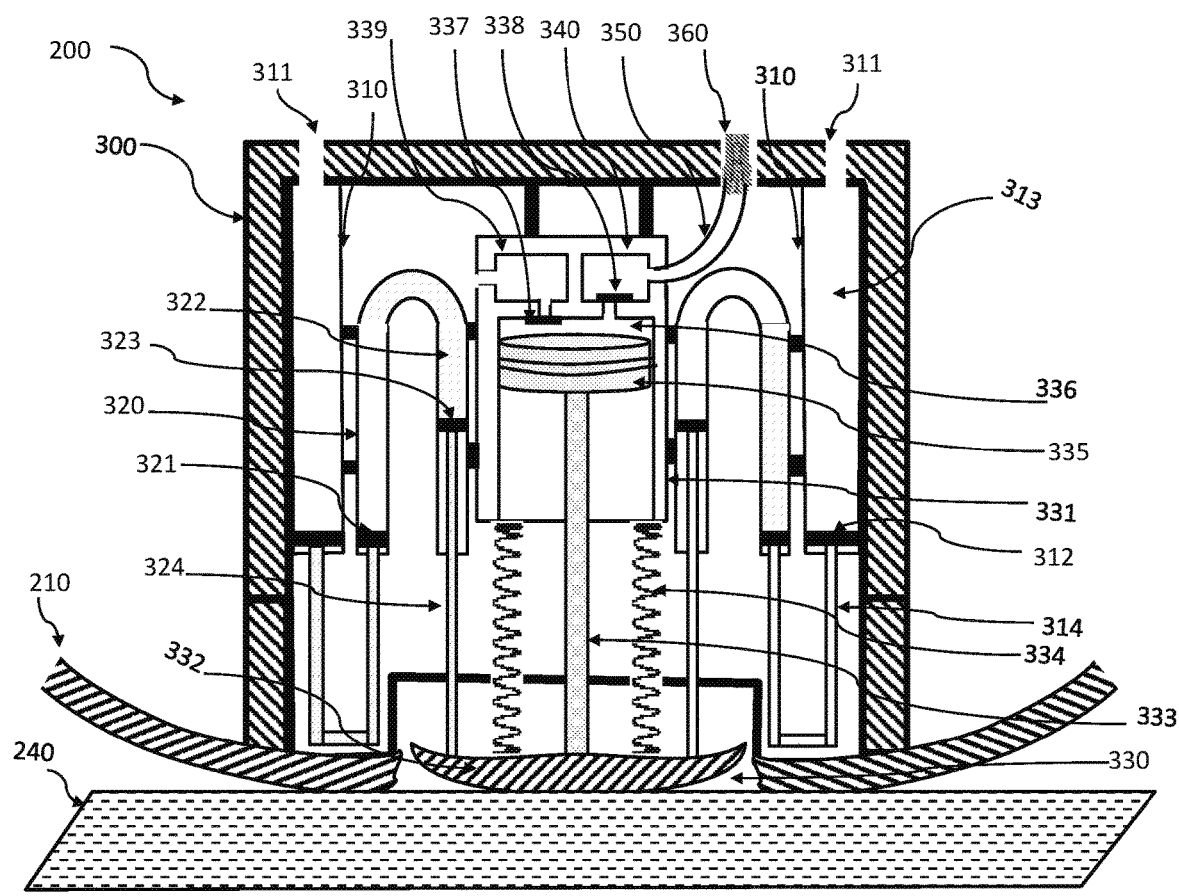
FIG. 3A depicts a schematic diagram in a vertical cross-sectional view of the salient components of a tire regulation system in a state when the tire pressure is optimum according to a first embodiment of the current invention.

FIG. 3A depicts a schematic diagram in a vertical cross-sectional view of the salient components of a tire regulation system 200 in its normal state when the tire pressure is equal to a predetermined value, in accordance with a first embodiment of the current invention. The predetermined vale is usually the pressure recommended by the vehicle or the tire manufacturer. One or more actuators 310 are affixed at the inside wall or walls of the housing 300. The housing 300 can be one of many shapes including square box, hexagonal box, octagonal box, and cylinder. The actuator 300 can be a single actuator along the entire periphery of the housing 300. For example, in the case of the housing being cylindrical, the actuator 310 is a single actuator that is cylindrical along the entire inside wall of the housing 300. A single actuator in FIG. 3A is shown in two sections each at the two ends of the housing 300 in the vertical cross-sectional view. Alternately, the actuator 310 can be two or more actuators along the periphery of the housing 300. FIG. 3A in this case shows the actuators as two independent actuators.

The actuator 310 in FIG. 3A is a modified version of a double acting single rod actuator. The actuator 310 is pneumatically coupled to the inside of the tire through an opening 311. The actuator 310 includes a piston 312 which moves up or down in the chamber 313 of the actuator 310. The piston 312 is attached to a piston rod 314. In a conventional double acting single rod actuator the piston is pulled out or pushed in depending on the differential air pressure in the two opposite sides of the piston 312 inside the chamber 313. In the modified actuator 310, the actuator rod itself provides the force on the piston 312 on one side opposing the tire pressure on the other side of the piston 312. The actuator rod 314 in the modified actuator 310 is U-shaped which is connected at the other end to a reverse actuation element 320.

The function of the reverse actuation element 320 is to move another rod in the opposite direction of the movement of the actuator rod 314. The reverse actuation element 320 includes two pistons one in each arm of the U-shaped body of the actuator 320 that is partially filled with a substantially incompressible fluid 322. Typically a liquid is substantially incompressible. Low coefficient of thermal expansion should be another selection criterion of the fluid. As such petroleum based oil could be used. The piston 321 and the piston 312 are coupled by the rod 314. The piston 321 is in the outer arm of the U-shape of the reverse actuation element 320. Another piston 323 is at the other end of the fluid in the inner arm of the U-shaped body of the reverse actuation element 320. A rod 324 is attached to the piston 323 at one end and to a pump handle 332 of an air pump 330 at the other end.

A piston rod 333 couples a pump piston 335 inside the pump body 331 and the pump handle 332. A spring 334 is attached to the outer surface of the pump body 331 at one end and to the inner side of the pump handle 332 at the other end. The spring 334 can be a single spring coiled around the piston rod 333 or can be multiple springs. In the pump are an inlet valve 337 and an outlet valve 338. The inlet valve 337 is mounted inside the pump chamber 336 at the end of an opening to pneumatically connect an inlet valve head 339 of the pump. The inlet valve head 339 includes another opening for air intake from the atmosphere. The outlet valve 338 is inside the outlet valve head 340. The outlet valve head 340 is pneumatically coupled by a pipe or tube 350 with the tire 210 through a valve or an opening 360. The valve 360 can be a regular stem valve commonly used in all tires.

The regulation system 200 in FIG. 3A is in its normal state when the tire pressure is equal to the predetermined value. In the normal state the spring 334 is compressed. The compressed spring 334 exerts a force on the pump handle 332 pulling the pump handle 332 outwards. A second force is exerted on the pump handle 332 by the piston rod 324 pushing the pump handle 332 inwards. The second force is generated by the tire pressure on the piston 312 that is transmitted to the pump handle 332 via the rod 314, the piston 321, fluid 322, piston 323 and the rod 324. The magnitude of the force arising from the compressed spring 334 is proportional to the extent of compression of the spring 334 according to the well-known Hook's law. The spring is selected such that in the aforementioned normal state the spring is sufficiently compressed to counterbalance the force originating from the air pressure of the tire when the tire is inflated to the predetermined value.

Figure 3B:
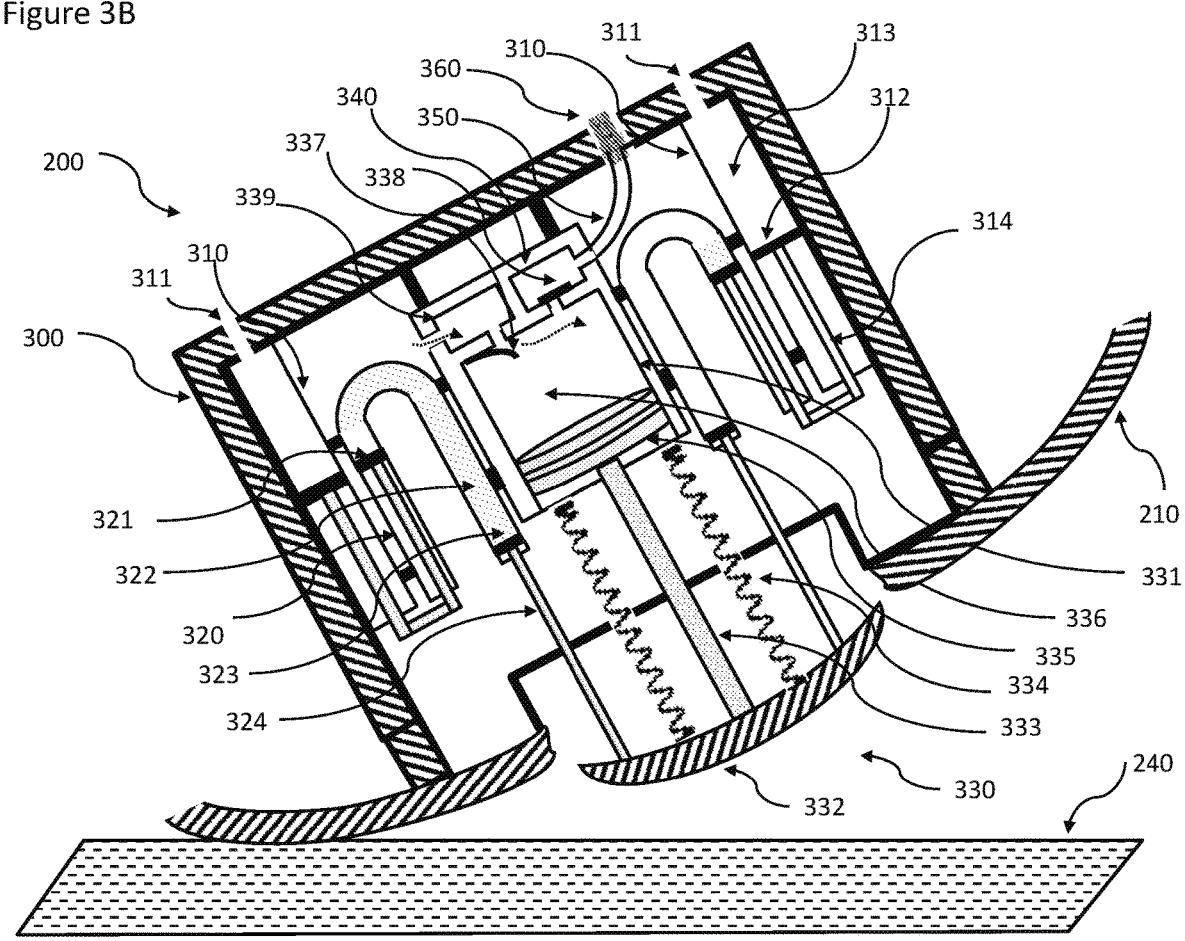
FIG. 3B depicts a schematic diagram of the salient components of the tire pressure regulation system in FIG. 3A when the tire pressure is below the optimum value resulting in the piston being pulled out.

FIG. 3B depicts a schematic diagram of the salient components of the tire regulation system when the tire pressure is below the predetermined value resulting in the piston 335 being pulled out. Because of the force imbalance in the underinflated state of the tire 210 the piston 312 is pushed into the actuator 310 towards the opening 311. When the piston 312 is pushed into the actuator 310 the piston 321 in the reverse actuation element 320 is pushed into the outer arm of the actuator element 320 and consequently the piston 323 and the rod 324 are pulled outwards. As the rod 324 is pulled outwards the spring compression of the spring 334 is relaxed and the pump handle 332 is pulled out. When the pump handle 332 is pulled out the piston 335 in the pump 330 is also pulled out. As the piston 335 is pulled out, the inlet valve 337 is opened and the pump chamber 336 is filled with a quantity of atmospheric air coming through the opening in the inlet valve head 339.

Figure 3C:
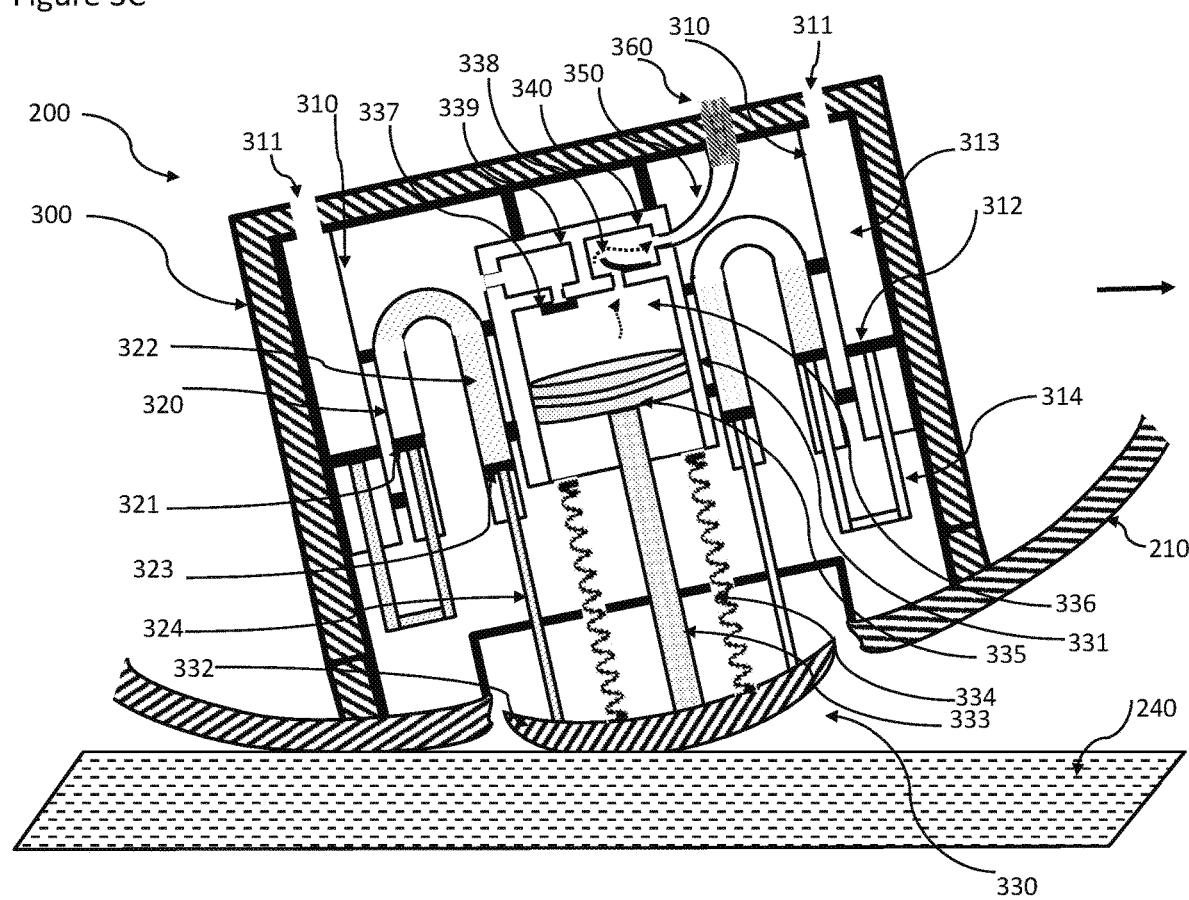
FIG. 3C depicts a schematic diagram of the salient components of the tire pressure regulation system in FIG. 3A when the tire pressure is below the optimum value and the pulled out piston is being pushed in by road contact of the pump handle while the vehicle is in motion.

FIG. 3C depicts a schematic diagram of the salient components of the tire pressure regulation system when the tire pressure is below the predetermined value and the pulled out piston is being pushed in by road contact of the pump handle while the vehicle is in motion. As the vehicle moves the tire rotates and the pump handle 332 comes into contact with the road surface 240 causing the pump piston 335 to be pushed into the pump chamber 336. As the piston is pushed into the chamber the quantity of atmospheric air taken into the chamber 336 during the pulling out operation of the piston handle 332 is compressed and the inlet valve 337 is closed. As the quantity of atmospheric air in the chamber 336 is sufficiently compressed the outlet valve 338 opens and at least a portion of the quantity of compressed air in the chamber 336 is discharged into the tire 210 through the valve stem or opening 360. As the tire rotates further and the handle 332 is no longer in contact with the road surface the pump handle is pulled out again if the tire pressure is still lower than the recommended value. The piston strokes—pulling out by the lower tire pressure and pushing in by the road contact—continues until the tire is inflated to the recommended value and the force by the spring compression and the force generated by the tire pressure are balanced and the piston 335 is substantially completely pushed into the chamber 336.

FIG. 4 depicts a schematic diagram in a vertical cross-sectional view of the salient components of the tire regulation system 400 according to a second embodiment of the invention. The pressure regulation system 400 is mounted in a cavity made inside the crown of the tire 402. A sufficiently deep cavity to hold the regulation system 400 completely inside the crown and to be flush with the outer surface of the tire is created so that the contact of the tire 402 with a road surface 240 is smooth. This may require appropriate structural modification of the tire to hold the regulation system 400. One or more actuators 410 are affixed at the inside wall or walls of the housing 401. Actuator 410 (single cylindrical actuator or multiple actuators) is pneumatically coupled by a tube or pipe 412 with the tire at an opening 411. The tube 412 connects the actuator body at a point below the actuator piston 413 and towards the lower end of the actuator body 410. A spring 414 is attached at the upper end of the piston and at the base of the actuator 410. The piston 413 is coupled with the pump handle 432 by a rod 415. An O-ring or similar mechanism (not shown) is provided in the actuator through which the rod 415 moves in and out without any air leak. In the first embodiment described earlier no such mechanism to make the contact of the rod 312 and the actuator 310 air tight is required. The rest of the pump 430 is similar to the one described in FIGS. 3A, 3B and 3C except that there is no spring corresponding to the spring 334 in FIGS. 3A, 3B and 3C. In particular, the inlet valve 437 inside the inlet valve head 439 opens to take in air from the atmosphere when the piston 435 is pulled out and the valve 438 inside the outlet valve head 440 opens to push air into the tire 402 via the valve stem 460 when the piston 435 is pushed in.

According to the second embodiment in FIG. 4, the spring 414 is selected such that the spring is compressed to an extent to counter balance the force on the piston exerted by the tire air. The length of the rod 415 and the length of the rod 433 are selected such that the pump handle 432 is flush with the crown of the tire when the tire air pressure is optimum. There is a reduction in the upward force on the piston 413 when the tire pressure drops below the optimum value. The reduction in the upward force causes the piston 413 to move outwards. The outward movement in turn causes the pump handle 432 and the piston 435 to be pulled out. As the piston 435 is pulled out a quantity of atmospheric air is taken into the pump body 431. As described in the context of the first embodiment, the handle 432 is then pushed back into the pump body 431 when it comes in contact with the road surface. As the piston 435 is pushed into the pump body 431, the quantity of atmospheric air in the pump body 431 is compressed and at least a portion of the compressed air is discharged into the tire through the pump valve 438.

Figure 5:
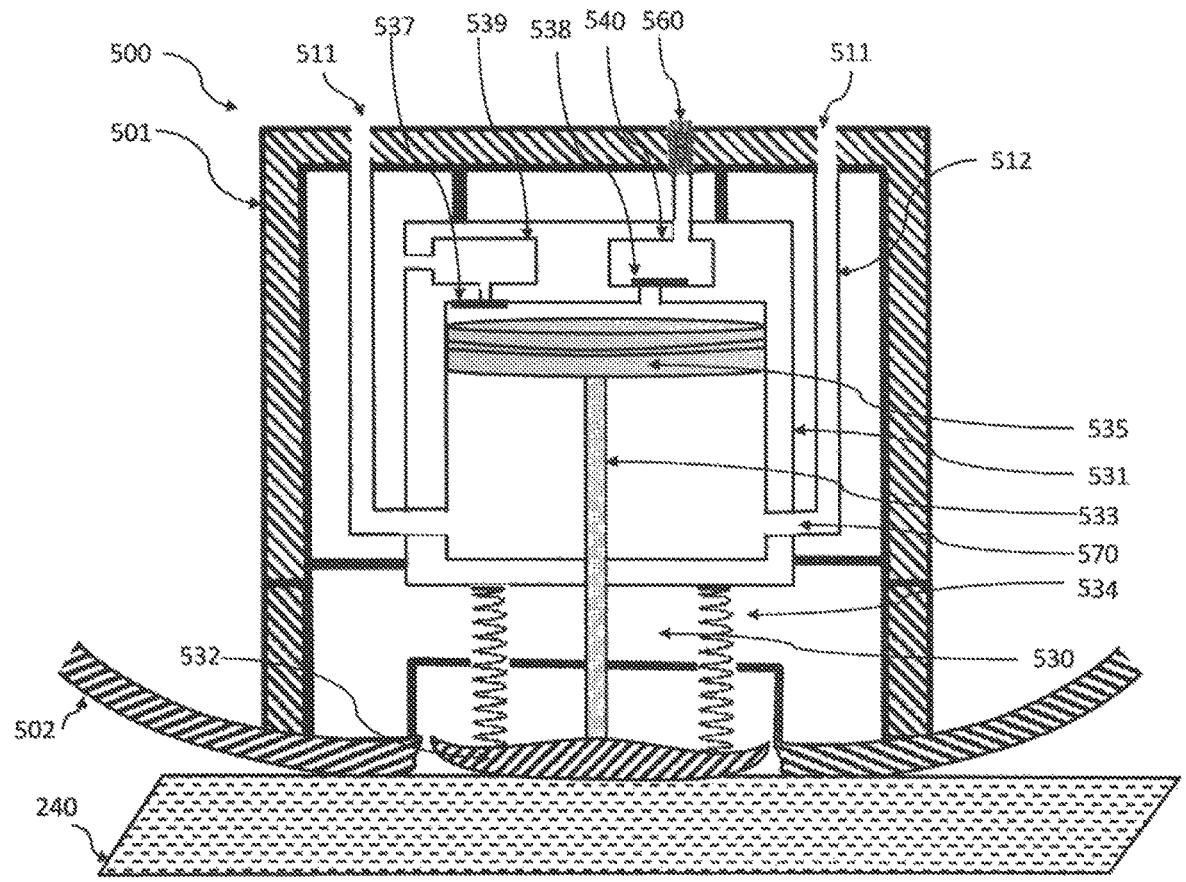
FIG. 5 depicts a schematic diagram in a vertical cross-sectional view of the salient components of the tire pressure regulation system according to a third embodiment of the invention.

FIG. 5 depicts a schematic diagram in a vertical cross-sectional view of the salient components of the tire regulation system 500 according to a third embodiment of the current invention. The pressure regulation system 500 is mounted in a cavity made inside the crown of the tire 502. A sufficiently deep cavity to hold the regulation system 500 completely inside the crown and to be flush with the outer surface of the tire is created so that the contact of the tire 502 with a road surface 240 is smooth. This may require appropriate structural modification of the tire to hold the regulation system 500. The pump piston 535 and the pump handle 532 of a pump 530 are coupled by a rod 533. A pump body 531 of the pump 530 is pneumatically coupled with the tire 502 by a tube or a pipe 512 at one end via an opening 511 in the tire 502 and at the other end via an opening 570 in the pump body 531. The inlet valve head 539, inlet valve 537, outlet valve head 540, and outlet valve 538 are at one end of the piston 535 in the pump body 531. The opening 570 is at the opposite end of the piston 535 preferably closer to the outer end of the pump body 531. One or more springs are attached to the pump handle 532 at one end and at the pump body at the other end.

According to the third embodiment in FIG. 5, the spring 534 is compressed to an extent so that a pulling force by the compressed spring(s) 534 on the handle 532 and thereby on the piston 535 counter balances a net pushing force arising from the tire air pressure. Normally the air pressure in the tire is greater than the atmospheric air pressure. Consequently there is a net force generated by air on the piston 535 pushing it into the pump body. The net pushing force is equal to the difference in the tire air pressure and atmospheric air pressure multiplied by the area of the piston 535. The length of the rod 533 and the extent of compression of the spring(s) 534 are selected such that the pump handle 532 is flush with the crown of the tire when the tire air pressure is optimum. The net pushing force on the piston 535 is reduced when the tire pressure drops below the optimum value causing the piston 535 to be pulled outwards by the compressed spring 534. As the piston 535 is pulled out the inlet valve 537 inside the inlet valve head 539 opens and a quantity of atmospheric air is taken into the pump body 531. As described in the context of the first embodiment, the handle 532 is then pushed back when it comes in contact with the road surface causing the piston 535 to be pushed into the pump body 531. As the piston 535 is pushed into the pump body the atmospheric air in the pump body is compressed and the outlet valve 538 in the outlet valve head 540 opens to let at least a portion of the compressed air to be discharged into the tire through the pump valve 538 and the valve stem 560.

The spring 534 in FIG. 5 is shown to be attached to the pump handle 532 and the pump body 531. However, the spring 534 can be attached at other points in the pump 530 with equivalent function of the spring 534 described earlier. For example, in a first alternative configuration, the spring 534 is inside the pump body 531 and is attached at the lower end of the piston 535 and the lower end of the pump body 531. In the first configuration the spring 534 is stretched so that it exerts a pulling force on the piston 535 pulling it outwards balancing the pushing force on the piston 535 by the tire air. In a second alternative configuration, the spring 534 is also inside the pump body 531 but is attached at the upper end of the piston 535 and the upper end of the pump body 531. In second configuration, the spring 534 is compressed so that it exerts a pulling force on the piston 535 pulling it outwards balancing the pushing force on the piston 535 by the tire air.

The number of strokes required to inflate the tire from an underinflated value to the recommended value depends on several parameters including the spring constant of the spring(s) and the cross-sectional areas of the pistons. The parameters can be selected to determine a suitable number of strokes required to inflate the tire. An exemplary set of such parameters are illustrated in the following section.

Figure 6A:
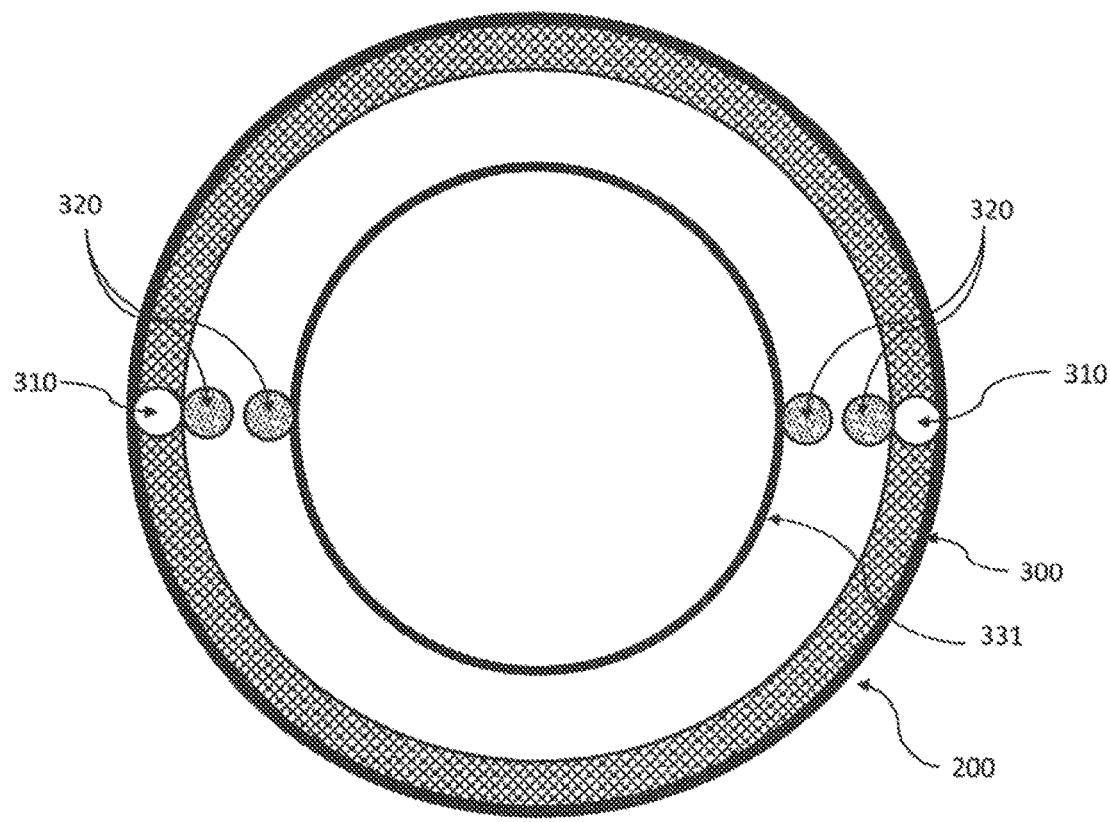
FIG. 6A depicts a schematic diagram in a horizontal cross-sectional view of the tire pressure regulation system of the current invention with two actuators and two reverse actuating elements.
Figure 6B:
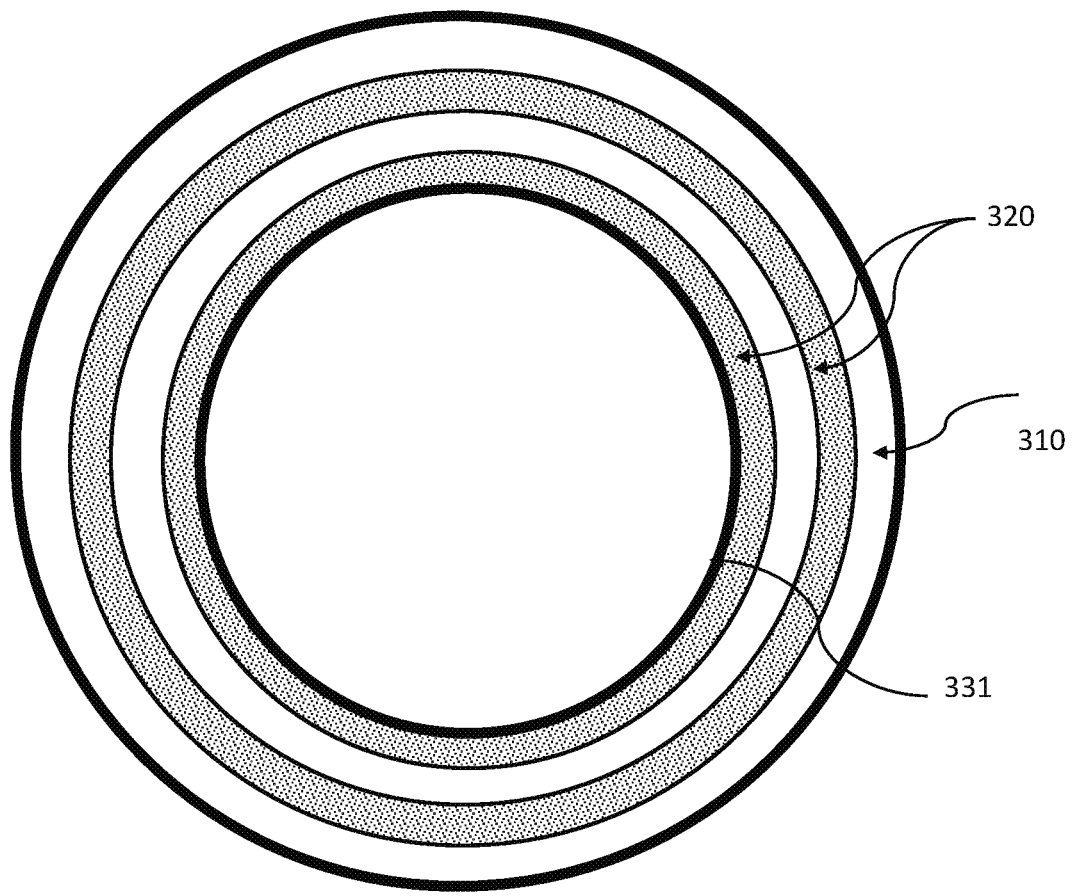
FIG. 6B depicts a schematic diagram in a horizontal cross-sectional view of the tire pressure regulation system of the current invention with one cylindrical actuator and one cylindrical reverse actuation element.

FIGS. 6A and 6B depict the salient components of the tire pressure regulation system 200 in a horizontal cross-sectional view to facilitate the calculation. Shown in FIG. 6A is a horizontal cross-sectional view of the regulation system 200 wherein there are two independent actuators 310 attached to two diametrically opposite ends of the inner wall of the regulation system housing 300. Also shown are two U-shaped reverse actuation elements at the two diametrically opposite ends located between the actuators 310 and the pump chamber 331. Shown in FIG. 6B is a horizontal cross-sectional view of the regulation system 200 wherein the actuator 310 is a single cylindrical actuator around the entire inner wall of the housing 300. Regardless of the shapes of the actuators a total surface area of the piston 310 is assumed to be 1 cm² for the purpose of the following calculation. At a typical tire pressure of 32 psi (in metric units 22.1 N/cm²) the total force exerted on the piston 310 by the compressed air in the tire is 22.1 N/cm². The spring 334 is selected so that the total spring constant (compounded spring constant for two or springs) is 0.3 N/mm. Using Hook's law the compression of the spring to balance the force arising from the tire air pressure is calculated to be 7.4 cm. The object is to calculate the number of strokes when the tire is underinflated at 30 psi. The total force on the spring 334 is then reduced by 1.4 N/cm². The reduction of the force relaxes the spring 334 by about 0.5 cm. The piston 334 diameter is selected to be 8 cm. The volume of the atmospheric air taken into the pump chamber 336 when the piston 335 is pulled out by 0.5 cm is 23.1 cm³. Using Boyle's law the volume of atmospheric air needed for the inflation of a P215/65 R15 tire from 30 psi to 32 psi is calculated to be 6554 cm³. From the two volumes calculated above the number of strokes is determined to be 284. With 284 strokes and therefore 284 rotations the tire is inflated from 30 psi to 32 psi and the vehicle is driven by 0.3 km. A person skilled in the art can appreciate that there is flexibility in selecting the shapes and sizes of the actuators and the springs to properly design the regulation system 200.

Figure 7:
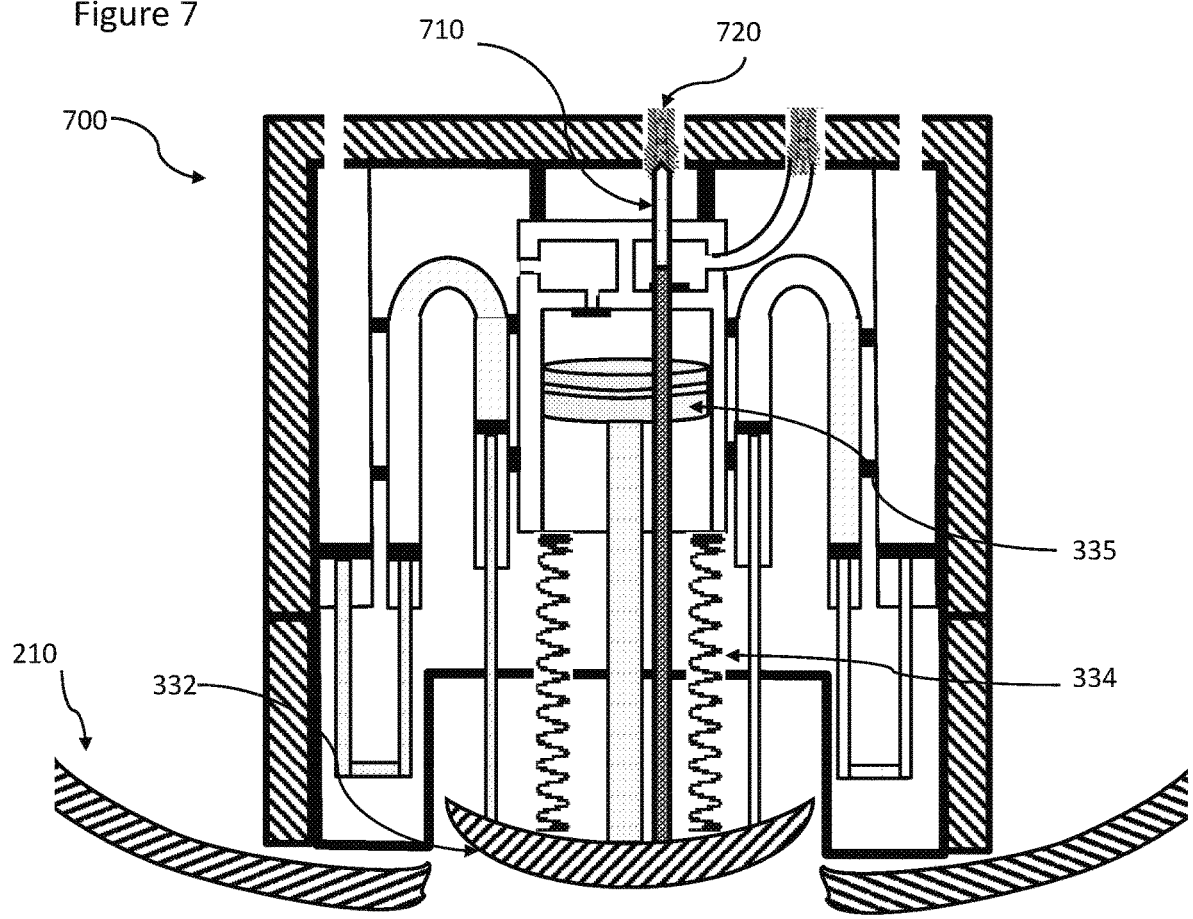
FIG. 7 depicts a schematic diagram in a vertical cross-sectional view of the salient components of a tire pressure regulation system in which a deflation mechanism is included to deflate the tire when the tire pressure is too high.

FIG. 7 depicts a schematic diagram of the salient components of a tire pressure regulation system 700 which includes a deflation mechanism to deflate the tire when the pressure is too high in addition to the regulation system 200. Attached to the pump handle 332 is a rod 710 with a pointed head. The length of the rod 710 is selected such that the head of the rod points to an additional valve stem 720 provided in the tire 210 when the tire pressure is optimum. When the tire pressure is above the optimum value the spring 334 is compressed further causing the pump handle 332 to be pushed further into the pump chamber than the normal position. As the handle 332 is further pushed into the pump the pointed head of the rod 710 comes into contact of the valve stem 720 and pushes the valve therein to let out some air from the tire. Sudden impact of a rough road surface on the tire could cause the tire pressure to rise momentarily. The gap between the head of the rod 710 and valve 720 can be designed properly in order to avoid the rod 710 letting out air from the tire in such conditions. For example, if the normal tire pressure is 32 psi the gap can be designed so that it does not let any air until the pressure is 32.5 psi.

In an alternative embodiment, the tire pressure regulation system 200 is not an integral part of the tire 210. Instead the tire regulation system 200 is mounted on the axle and pneumatically connected to the tire 210 via additional tubes and valves.

In yet another alternative embodiment, the pulling out of the pump handle 332 when the air pressure is low is carried out by an electrical device powered by one or more batteries. The electrical device to pull out the pump handle is activated by an electrical signal. The electrical signal is generated when the tire pressure is low and as a result an actuator piston 335 is pressed on a piezoelectric device. In this embodiment no counterbalancing spring is needed. A weak spring just to hold the pump piston in its normal state when the pressure is optimum would suffice.

Certain features are of utility and may be employed in the regulation system of the invention. For example, it is desirable to alert the driver if there is a leak in the tire. When there is a leak the pump would be active continuously or regularly. The system can be equipped with a piezoelectric device such that whenever there is a pump piston stroke, the piezoelectric device is pressed by a rod or piston 335. As the piezoelectric device is pressed it generates an electrical signal that can be recorded in a simple computer chip such as a microcontroller or an RFID (radio frequency identification) chip. The vehicle computer can then read the number of pump strokes periodically and use an appropriate algorithm to determine if there is a leak in the tire.

In another example, with reference to FIG. 3A, it is desirable that the two joints of the piston rod 333 with the piston 335 and with the pump handle 332 are not fixed so that any lateral impact on the pump body is minimized when the handle comes in contact with the road surface. The two joints can be made flexible with wrist pins, eccentric bearings, ball bearings and such.

In yet another example, with respect to FIG. 3A, the valve in the valve stem 360 can act as the outlet valve 338 or the valve 360 alone without any valve in the valve stem 360 may be sufficient since the pipe 350 is permanently attached with the tire.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "first embodiment" or "second embodiment" or "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "first embodiment," "second embodiment," "third embodiment," "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A tire pressure regulation apparatus for use with a tire comprising: a housing for said apparatus, a pump body, a pump piston, a pump handle, a first rod, an atmospheric air inlet, an inlet valve, an air outlet, and an outlet valve;

wherein said first rod couples said pump handle and said pump piston;

wherein said pump handle is pulled out responsive to the air pressure of said tire reaching a value below a predetermined air pressure value thereby a quantity of atmospheric air being taken into said pump body via said air inlet and said inlet valve; and wherein said pump handle having been pulled out and coming in contact with a road surface when said tire mounted on a vehicle rotates is pushed into said pump body thereby discharging at least a portion of said quantity of atmospheric air into said tire via said outlet valve and said air outlet.

2. The apparatus of claim 1 wherein said apparatus further comprises an actuator body, a first piston inside said actuator body, a U-shaped rod, a U-shaped tube partially filled with a substantially incompressible fluid, a second piston at one end of said fluid, a third piston at the other end of said fluid, a second rod, and one or more springs;

wherein said actuator body is pneumatically coupled with said tire;

wherein said U-shaped rod couples said first piston and said second piston;

wherein said second rod couples said third piston and said pump handle; and wherein said one or more springs couple said pump handle and either said pump body or said housing.

3. The apparatus of claim 2 wherein said one or more springs is compressed or expanded exerting a pulling force to pull said pump handle outwards;

wherein a pushing force on said pump handle pushing said pump piston inwards is generated by the air pressure of said tire and transmitted via said first piston, said U-shaped rod, said second piston, said third piston and said second rod;

wherein at least one of the length, the amount of compression or expansion, and the spring constant of said one or more springs is selected so that the amount of said pulling force is substantially equal to the amount of said pushing force on said pump piston; and wherein the length of one or more of said first rod, said second rod, and said U-shaped rod is selected so that the outer surface of said pump handle substantially matches the outer surface of said tire when the air pressure of said tire is equal to said predetermined air pressure value and said pump piston is substantially completely pushed into said pump body.

4. The apparatus of claim 1, wherein said apparatus further comprises an actuator body, an actuator piston inside said actuator body, a second rod, and one or more springs;

wherein said one or more springs couple said actuator body and said actuator piston;

wherein said second rod couples said pump handle and said actuator piston; and wherein said actuator body is pneumatically coupled with said tire by a tube or a pipe.

5. The apparatus of claim 4 wherein said second rod connects at least one of said pump handle and said actuator piston via one of a wrist pin, an eccentric bearing, and a ball bearing.

6. The apparatus of claim 4 wherein said one or more springs is compressed or expanded exerting a pulling force to pull said actuator piston outwards;
    wherein the air pressure of said tire is transmitted via said pipe or tube exerting a pushing force on said actuator piston pushing said actuator piston inwards;
    wherein at least one of the length, the amount of compression or expansion, and the spring constant of said one or more springs is selected so that the amount of said pulling force is substantially equal to the amount of said pushing force; and
    wherein the length of one or both of said first rod and said second rod is selected so that the outer surface of said pump handle substantially matches the outer surface of said tire when the air pressure of said tire is equal to said predetermined air pressure value and said pump piston is substantially completely pushed into said pump body.

7. The apparatus of claim 1 wherein said atmospheric air inlet is pneumatically coupled with the atmosphere via said inlet valve;
    wherein said air outlet is pneumatically coupled with said tire; and
    wherein said first rod connects at least one of said pump handle and said pump piston via one of a wrist pin, an eccentric bearing, and a ball bearing.

8. The apparatus of claim 1 wherein said apparatus further comprises an electrical actuator and an electrical control signal generator;
    wherein said control signal generator is a piezoelectric device;
    wherein said electrical actuator pulls out said pump handle in response to an electrical control signal generated by said control signal generator; and
    wherein said control signal generator generates said electrical control signal when said control signal generator is pushed by a piston of said electrical actuator or by said pump piston responsive to the air pressure of said tire reaching a value below said predetermined air pressure value.

9. The apparatus of claim 1 wherein said housing is mounted inside a cavity made underneath a portion of a crown of said tire;
    wherein the outer surface of said piston handle is substantially flush with the outer surface of said tire when the air pressure of said tire is substantially equal to said predetermined air pressure.

10. The apparatus of claim 1 wherein said predetermined air pressure value is a value recommended for said tire.

11. The apparatus of claim 1 further comprises a deflation rod with a pointed head attached to said pump body or said housing;
    wherein the length of said deflation rod is selected so that said pointed head of said deflation rod is close but not pressing the valve of a valve stem attached to said tire when the air pressure of said tire is below a predetermined high pressure value;
    wherein said predetermined high pressure value is selected to be higher than said predetermined air pressure value; and
    wherein said deflation rod is pushed towards the center of said tire responsive to the air pressure of said tire reaching a value equal to or greater than said predetermined high pressure value thereby causing said pointed head of said deflation rod to push the valve of said valve stem and letting out a quantity of air from said tire until the air pressure of said tire reaches a value equal to or less than said high pressure value.

12. The apparatus of claim 1 further comprises a piezoelectric device and an electronic circuit;
    wherein said piezoelectric device generates an electrical signal when said piezoelectric device is pushed by said pump piston in response to the air pressure of said tire reaching a value lower than said predetermined air pressure value;
    wherein said electronic circuit records a number indicating the number of times said electrical signal is generated within a predetermined time period;
    wherein said number is transmitted to a computer in said vehicle either periodically or in response to said circuit being interrogated by said computer; and
    wherein said computer determines if there is a leak in said tire based on said number and generates an alert indicating said leak.

13. A tire pressure regulation apparatus for use with a tire mounted on a vehicle comprising: a pump body, a pump piston, a pump handle, an air inlet, an inlet valve, an air outlet, an outlet valve, and one or more springs;
    wherein said pump body is pneumatically coupled with said tire via a tube or a pipe, and an opening to said tire;
    wherein said pump body is pneumatically coupled with atmospheric air via said air inlet and said inlet valve;
    wherein said pump body is pneumatically coupled with said tire via said air outlet and said outlet valve;
    wherein said pump piston and said pump handle are coupled by a rod;
    wherein said one or more springs couple said pump piston and said pump body either directly or via said pump handle and said rod;
    wherein said pump handle is pulled out in response to the air pressure of said tire reaching a value lower than a predetermined air pressure value thereby causing a quantity of atmospheric air to be taken into said pump body; and
    wherein said pump handle having been pulled out is pushed into said pump body when said pump handle comes into contact with a road surface as said tire mounted on a vehicle rotates thereby compressing said quantity of atmospheric air and discharging at least a portion of said compressed air into said tire.

14. The apparatus of claim 13 wherein said one or more springs are compressed or expanded thereby exerting an amount of pulling out force on said pump piston;
    wherein at least one of the length, the amount of compression or expansion, and the spring constant is selected so that said amount of pulling out force is substantially equal to the net pushing force on said pump piston arising from the difference of the force exerted by the tire air pressure on said pump piston on one side and the force exerted by atmospheric air on said pump piston on the other side of said pump piston;
    wherein said pump body is mounted inside a cavity made underneath a portion of the crown of said tire; and
    wherein the length of said rod is selected so that the outer surface of said pump handle substantially matches the outer surface of said tire when the air pressure of said tire is equal to said predetermined air pressure value.

15. The apparatus of claim 13 wherein said predetermined air pressure value is a value recommended for said tire.

16. The apparatus of claim 13 wherein said rod connects at least one of said pump handle and said pump piston via one of a wrist pin, an eccentric bearing, and a ball bearing.

17. The apparatus of claim 13 further comprises a deflation rod with a pointed head attached to said pump body;
   wherein the length of said deflation rod is selected so that the head of said deflation rod is close but not pressing the valve of a valve stem attached to said tire when the air pressure of said tire is below a predetermined high pressure value;
   wherein said predetermined high pressure value is selected to be higher than said predetermined air pressure value; and
   wherein said deflation rod is pushed towards the center of said tire responsive to the air pressure of said tire reaching a value equal to or greater than said predetermined high pressure value thereby causing said pointed head of said deflation rod to push the valve of said valve stem and letting out a quantity of air from said tire until the air pressure of said tire reaches a value equal to or less than said predetermined high pressure value.

18. The apparatus of claim 13 further comprises a piezoelectric device and an electronic circuit;
   wherein said piezoelectric device generates an electrical signal when said piezoelectric device is pushed by said pump piston in response to the air pressure of said tire reaching a value lower than said predetermined air pressure value;
   wherein said circuit records a number indicating the number of times said electrical signal is generated within a predetermined time period;
   wherein said number is transmitted to a computer in said vehicle either periodically or in response to said circuit being interrogated by said computer; and
   wherein said computer determines if there is a leak in said tire based on said number and generates an alert indicating a leak.

19. A method for regulating air pressure in a tire mounted on a vehicle comprising:
   holding a pump piston of an air pump in a balanced state when the air pressure in said tire is substantially equal to a predetermined air pressure value wherein said pump piston is coupled with a piston handle;
   pulling said piston outwards in response to the air pressure in said tire reaching a value below said predetermined air pressure value;
   pushing said pump piston having been pulled out into said pump in response to said piston handle coming in direct contact with a road surface as said vehicle moves; and
   continuing the piston stroke of moving said piston in and out as said tire continues to rotate until the air pressure of said tire is equal to said predetermined air pressure value.

20. The method of claim 19 further comprising:
   determining the spring constant of one or more springs transmitting a force on said piston to balance the force exerted in the opposite direction on said piston by the air pressure of said tire; and
   determining a set of parameters of said pump based on a predetermined number of piston strokes required for the air pressure of said tire to equalize with said predetermined air pressure value from an air pressure value lower than said predetermined air pressure value;
   wherein said set of parameters includes one or more of: the length of said piston, the cross-sectional area of said piston, and the volume of said pump.

* * * * *